United States Patent
Lee et al.

(10) Patent No.: US 6,513,747 B1
(45) Date of Patent: Feb. 4, 2003

(54) PRETENSIONER INTEGRATED WITH A FORCE TRANSFERRING APPARATUS OF A SEAT BELT RETRACTOR

(75) Inventors: Jong-hoon Lee, Seoul (KR); Sung-woo Jin, Seoul (KR); Seung-man Kim, Seoul (KR)

(73) Assignee: Delphi Automotive Systems Sungwoo Corporation, Seoul (KR)

( * ) Notice: Subject to any disclaimer, the term of this patent is extended or adjusted under 35 U.S.C. 154(b) by 0 days.

(21) Appl. No.: 09/633,971

(22) Filed: Aug. 8, 2000

(30) Foreign Application Priority Data

Jun. 22, 2000 (KR) .............................................. 00-34583

(51) Int. Cl.$^7$ ................................................ B60R 22/36
(52) U.S. Cl. ........................ 242/374; 280/806; 280/807
(58) Field of Search ........................ 242/374; 280/806, 280/807; 297/476, 477, 478

(56) References Cited

U.S. PATENT DOCUMENTS

| | | | |
|---|---|---|---|
| 5,547,214 A | 8/1996 | Zimmerman, II et al. | .................... 280/730.1 |
| 5,586,782 A | 12/1996 | Zimmerman, II et al. | .................... 280/730.2 |
| 5,765,774 A | * 6/1998 | Maekawa et al. | ........... 280/806 |
| 5,860,673 A | 1/1999 | Hasegawa et al. | ....... 280/730.2 |

FOREIGN PATENT DOCUMENTS

WO  PCT/US98/19204  5/1999

* cited by examiner

Primary Examiner—John Q. Nguyen
(74) Attorney, Agent, or Firm—Fish & Richardson P.C.

(57) ABSTRACT

A pretensioner comprises a pyrotechnic force generating device including a horizontal tube with a propellent charged cartridge, a housing receiving one end of the cylinder with the horizontal tube being supported to cooperate with the force generating device in order to reverse-rotate the reel; a force transmitting portion including an arm positioned in a first chamber of the housing, one end of which is directed to the piston in the cylinder and the other end of which is extended out of the cylinder, a pulley rotatably mounted on the other branched end of the arm and a cable fixed at one end to the housing, passed through the pulley, wound around the clutch disk and fixed at the other end to the clutch disk; and a pretensioner positioned in a second chamber, which comprises the clutch disk and a clutch portion, in which the clutch disk includes a circular groove formed around the periphery thereof to allow a length of the cable to be wound thereon, a plurality of second coupling projections each having a right-angled surface toward one direction and a slanted surface toward the other direction, at least three of coupling grooves cut out at one side in a right-angle and at the other side in a slant angle and a first fixing groove formed to fix the other end of the cable, and the clutch portion includes at least three of first coupling projections forming a slanted surface at one side and a right-angled surface at other side for cooperating with the coupling grooves and a plurality of third coupling projections or concaved grooves formed at the positions facing to the second coupling projections on one side surface of the reel.

6 Claims, 12 Drawing Sheets

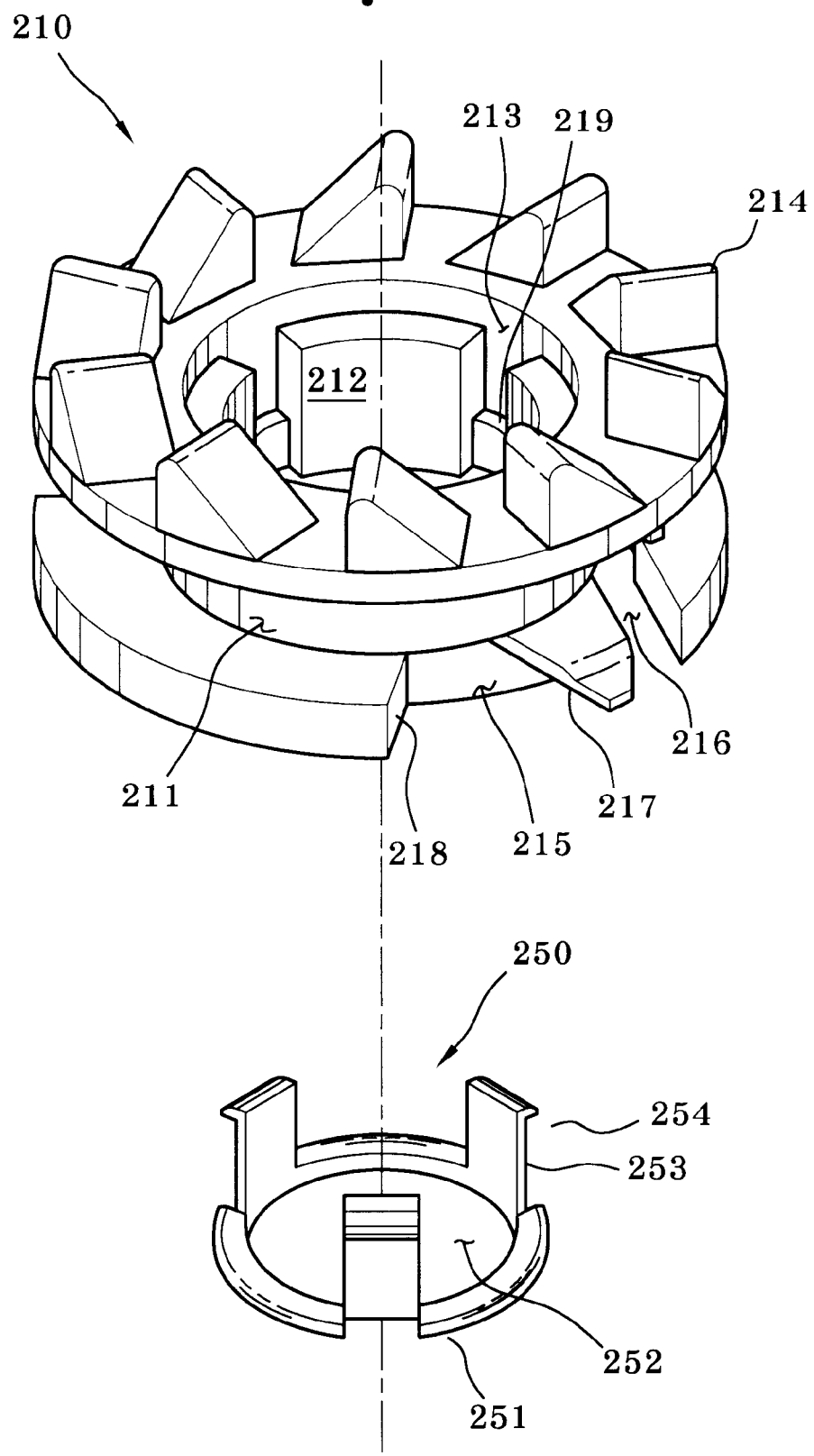

PRETENSIONER INTEGRATED WITH A FORCE TRANSFERRING APPARATUS OF A SEAT BELT RETRACTOR

BACKGROUND OF THE INVENTION

1. Field of the Invention

The invention is related to providing a pretensioner of a safety belt retractor, and particularly, to a pretensioner integrated with a force transmitting apparatus of a seat belt retractor for reverse-rotating a reel of the retractor on which the safety belt is wound, forcedly, and transmitting the force to tighten the safety belt on an occupant's body upon the occurrence of accident.

2. Discussion of the Background

Until now, much effort has been given on the basic performance of a car such as a comfortable feeling during driving, the speed as well as on a safety apparatuses for protecting passengers. Especially, it is well-known that a safety belt retractor has been significantly developed in its safety performance in respect to passengers, and a pretensioner also has been matched up with the safety belt retractor to enhance the inherent performance of the safety belt retractor. The pretensioner reversely rotates a retractor reel to pull a predetermined length of the safety belt by the power of a power generator using a Pyrotechnic for generating gas or other powers upon the sudden deceleration of the car, for example a crash or an accident. But, it is not certain that the pretensioner already developed would be able to comply with the inherent purpose of restraining the passenger in the seat. The reason is because the technical difficulties exist in adjusting the rewinding length of the safety belt according to the generating power due to the separation of the pretensioner from the generating apparatus.

A typical example of this technique is U.S. Pat. No. 3,043,093 which describes an actuator operated by a gas pressure. The actuator includes a piston which is movably disposed in a cylinder. The cylinder is closed at one end by a bracket and has a gas inlet port through which a gas under pressure may be delivered from any suitable source. A pulley is pivoted in the piston and journaled to cooperate with a cable. The cable has one of its ends from which it passes over a pulley to another pulley fixed to a shaft. On the same shaft as the pulley are a first pulley and a second pulley. The first pulley functions through a cable to operate a load device such as a belt, and the second pulley functions through a web to operate another load device such as means for positioning the shoulders of a pilot. Herein, it is known that the pulley of the shaft and the cylinder including a piston are mounted as the actuator having the same function as the pretensioner. But, the actuator has a possibility to distort the operation of the shaft pulley due to the reverse operation of the first and second pulley against each other, thereby not securing the moving distance of the piston, namely the rewinding length of the belt.

Another example adopting the patent to a vehicle is U.S. Pat. No. 4,423,846 which discloses a retightener for automatic safety belt roll-up devices with a power reservoir, which can be triggered in case of a crash and with an energy transducer which acts upon the belt shaft of the automatic winder after triggering the power reservoir, causing the automatic winder to perform a rotary retightening motion. For example, the retightener is provided with an automatic safety belt winder. A belt shaft is extended beyond a rewind spring cover by a shaft extension. The face of the shaft extension has sawtooth-shaped axial teeth which can be coupled to correspond to sawtooth-shaped and axial counter teeth of pulling means pulley. Serving the mounting of the pulling means pulley is a trunnion which is molded on a cup-shaped cover and permanently joined to the automatic winder housing or screwed by screws to the cover. The pulling means pulley is axially movable on the trunnion. Four cams are molded to the cover in the form of curved protruding in corresponding recesses with slanted, wedge-shaped strike surfaces in the pulling means pulley. A shear pin is fixed in the cover and projects into a hole in the pulling means pulley, fixing the latter in the inoperative, inactivated position. A cable or pulling means is connected to the pulling means pulley. Upon tension of the cable, the shear pin is sheared off, and at the same time the pulling means pulley is moved axial towards the axial teeth via cams, so that a coupling connection of the counter teeth and the axial teeth is established. This couples the belt shaft to the pulling means pulley, to the cable and to a preceding power reservoir drive. Consequently, the belt is tightened by turning the belt shaft again.

But, the retightener requires larger care in withdrawing a predetermined length of a belt because the cable length to be withdrawn is varied dependent upon the position of the pin. Also, because the retightener requires an auxiliary mechanism to be mounted for the operation of the pulling means pulley along with a power reservoir, the mounting of the safety belt retractor provided with the retightener is limited in respect of having to secure a space in the vehicle.

To overcome these disadvantages, a seat belt retractor with a pretensioner is disclosed in U.S. Pat. No. 5,489,072. As shown in FIG. 1, the retractor includes a spring casing 2 mounted on one side thereof and a spring 1 of a clock spring type retained in the spring casing 2, in which one end of the spring 1 is fixed to the fixing groove formed on the inner surface of the spring casing 2, and other end positioned in the center of the spring 1 is fixed to a fixing arbor 8 of the spring casing 2. The spring casing 2 is mounted on the side of a pretensioner housing 3. A reel 4 on which a safety belt is wound is rotatably mounted on an U-shaped bracket 6 by means of a shaft coupling member such as a bearing (not shown).

A pretensioner is mounted between the bracket 6 and the spring casing 2 and includes the housing 3 and a pyrotechnic force generator 21. The housing 3 is provided with a clutch drum 18, including three internal actuated indentations of an approximate triangle in the form of a pulley and three rollers 15. The housing 3 is provided with two frangible pins 12 integrally moulded on its interior and three integrally moulded frangible pegs 14 rotatably carrying each of roller 15.

Upon mounting of the pretensioner, each of the rollers 15 is seated on the rounded corner of the indentations 16 in the clutch drum 18 while being rotatably mounted on the pegs 14. The clutch drum 18 is mounted in the inner portion of the housing 3 with apertures 13 being coupled with the pins 12, respectively. Also, on the periphery of the clutch drum 18 there is formed a groove corresponding to a cable 19 with both side surfaces 17. A center shaft 10 of the reel 4 is passed through the indentation 16 of the clutch drum 18 and a hole of the housing 3 and then fixed to the fixing arbor 8. The cable 19 is turned over the groove of the clutch drum several times. One end of the cable 19 wound is fixed to the periphery of the clutch drum 18 and other end is connected to the pyrotechnic force generator 21. The pyrotechnic force generator 21 serves to pull the cable 19 connected to a piston (not shown) upward, when the vehicle is abruptly decelerated and an igniter (not shown) is detonated. At that time, the cable 19 rotates the clutch drum 18, and the frangible pins 12 are sheared. Then, the pegs 14 are sheared to enable the rollers 15 to be trapped in the locking position between the cam surfaces of the indentations 16 and the outer surface of the center shaft 10, thereby rotating the reel 4 by a predetermined number.

But, the pretensioner cannot have a predetermined withdrawal length of the cable, because the cable length is changeable according to the position of the cable fixing end on the periphery of the clutch drum, and the distance of play for coupling the rollers with the center shaft exists.

Furthermore, U.S. Patent '846 or '072 is subject to break the pins upon reverse-rotating of the clutch drum or the pulley using a power from a pyrotechnic force generator, but it is not certain that the clutch drum or the pulley may be not reverse-rotated on time. The patents requires a relative longer cable, because the pyrotechnic force generator has a relative longer length and a larger volume with a straight cylinder to turn the predetermined number of the drum or pulley. Due to this, the pretensioners have disadvantages in that the traveling length of the cable becomes longer, thereby deteriorating the response characteristics of the pretensioner. Especially, U.S. Patent '072 has a disadvantage in that the center shaft of a reel may be distorted or broken in a structural respect because the exceeding friction force may be generated upon the coupling of the rollers with the inner surface of an indentation to cause the center shaft to be trapped therebetween.

On the other hand, U.S. Pat. No. 5,588,608 and Japanese Unexamined Patent Publication No. Hei8-26070 discloses a pretensioner that reduces the traveling or driving length of a cable according to the rotation of a clutch drum or pulley. These patents comprise a webbing take-up device equipped with a pretensioner. The pretensioner includes a clutch mechanism and a gas generating device, wherein the generating device includes a cylinder attached alongside the webbing take-up device. The cylinder includes a box shaped piston disposed inside and the piston includes a pulley axially supported therein, which a wire is wound thereon. A gas generating device is mounted on the bottom portion of the cylinder. A wire is fixed at one end on the bottom surface of the cylinder and passed through the pulley on the piston and other pulley in turns. The other end of the wire is wound around and fixed to a rotating drum cooperating with a retractor reel. Therefore, when a predetermined gas pressure is generated from the gas generating device, as the piston is moved upward and the piston pulley is rotated, the wire is pulled through the other pulley to rotate the rotating drum and the retractor reel as well.

Japanese Unexamined Patent No. Hei 8-26070 discloses an improved technical contents of Patent '608, which is related to a wire holding structure of a pretensioner for shifting a piston, pulling a wire and drawing a wire out of a drum during the generating of gas. The direction of the wire between a first guide outside a cylinder and a second guide of a piston in the cylinder is tilted with respect to the piston shift direction. For it, the wire penetrates through the inside and outside a hole installed on a cylinder end wall to allow it the wire to establish the sealing of the cylinder. Also, the wire is wound around and penetrates through the cylinder which is then wound around the piston to increase its length.

Those patents can reduce the size of the gas generating device by extending the traveling length of the wire or cable, but the gas generating device is subject to mounting its cylinder separately from the wire drum or pulley. This means that a number of limitations exist in securing double mounting spaces. Particularly, because the pulley or the guide is positioned below the cable pulley or the wire drum thereby to form a gap between them, and the traveling distance of the wire is extended by the gap. Therefore, in order to minimize the traveling distance, the drum and the piston are preferably positioned to be on the same line. This means the exact adjustment of the traveling distance of the cable or wire is required. In order to resolve these problems of cited prior arts, the main object of the invention is to provide a pretensioner mounted on one side of a retractor and integrated with a gas generating apparatus for improving the performance of the force transmitting portion compared with a relative shorter traveling distance of the force transmitting portion.

Another object of the invention is to provide a pretensioner mounted in a housing together with a cylinder and a force transmitting portion to be integrated with a force transmitting apparatus.

Another object of the invention is to provide a pretensioner integrated with a force transmitting apparatus comprising a clutch apparatus of a new structure to secure the cooperation between a reel shaft and the clutch disk for receiving the force of a force transmitting portion.

Still another object of the invention is to provide a pretensioner integrated with a force transmitting apparatus further comprising a guider for enabling the smooth webbing of a safety belt to be withdrawn based on the operating of the pretensioner, thereby securing a predetermined traveling distance of the force transmitting portion.

SUMMARY OF THE INVENTION

As described above, according to the invention a safety belt retractor including a reel rotatably mounted on an U-shaped bracket to perform the webbing operating of a safety belt, a locking portion for restraining the rotating of the reel cooperating with a ratch gear formed on one side of the reel in an abnormal state of a vehicle, a spring portion including a spring of a clock spring type mounted on the other side of the reel to enable the reel to wind the belt thereon and a pretensioner mounted between the inner surface of the spring portion and the U-shaped bracket to reverse-rotate the reel and then withdraw a predetermined length of the safety belt by the force generated in a gas generating apparatus; comprises a pyrotechnic force generating means including a horizontal tube with a propellent charge cartridge mounted therein, a cylinder vertically extended from the other side of the horizontal tube and a piston movably mounted in the cylinder; a housing receiving one end of the cylinder with the horizontal tube being supported on the U-shaped bracket to cooperate with the force generating means in order to reverse-rotate the reel upon the force generating; a force transmitting portion including an arm positioned in the first chamber of the housing, one end of which is directed to the piston in the cylinder and the other end of which is extended out of the cylinder, a pulley rotatably mounted on the axes of the other branched end of the arm and a cable fixed at one end to a predetermined position of the housing, passed through the pulley, wound around the clutch disk by a predetermined turn and fixed at the other end to a predetermined position of the clutch disk; and a pretensioner positioned in a second chamber adjacent to the first chamber, which comprises the clutch disk and a clutch portion, in which the clutch disk includes a circular groove formed around the periphery thereof to allow a predetermined length of the cable to be wound thereon, a plurality of the second coupling projections each having a right-angled surface toward one direction and a slanted surface toward the other direction adjacent to the periphery of one side surface thereof, at least three of coupling grooves cut out at one side in a right-angle and at the other side in a slant angle and a first fixing groove formed to fix the other end of the cable, and the clutch portion includes at least three of first coupling projections forming a slanted surface at one side and a right-angled surface at other side for cooperating with the coupling grooves to allow the clutch disk to be reversely rotated and a plurality of third coupling projections or concaved grooves formed at the positions facing to the second coupling projections on one side surface of the reel.

Also, according to the invention, it is preferable that the three of the first coupling projections in the second chamber are positioned at different arc angles $\alpha$, $\beta$, $\gamma$ to be staggered from one another properly dividing the circumferential angle of 360° so that they are inserted into preferable insertion position of the coupling grooves except.

Also, according to the invention, it is preferable to freely rotate the pulley on the arm of the piston by means of a small bearing and a pin. The reason is because the friction of the cable on the pulley is minimized.

Also, according to the invention, it is preferable to mount the pulley in a manner that masses of both sides of the pulley become eccentric and the weight center of the pulley is slightly inclined toward one direction.

Also, according to the invention, it is preferable to form supporting grooves on both sides of the pulley and mount supporting bars at positions corresponding to at least one predetermined length of the cable, thereby securing the exact traveling length of the cable.

Also, according to the invention, it is preferable that the safety belt retractor further comprises a guider for guiding the safety belt during being wound on or released from the reel, especially for smoothing the webbing due to the reverse-rotating of the reel upon the operating of the pretensioner.

BRIEF DESCRIPTION OF THE DRAWINGS

The invention now will be described in detail in reference to the accompanying drawings, in which:

FIGS. 4A and 4B are perspective views illustrating a enlarged clutch disk and a fixing member according to one embodiment of the invention;

DETAILED DESCRIPTION OF THE PREFERRED EMBODIMENTS

Figure 1:
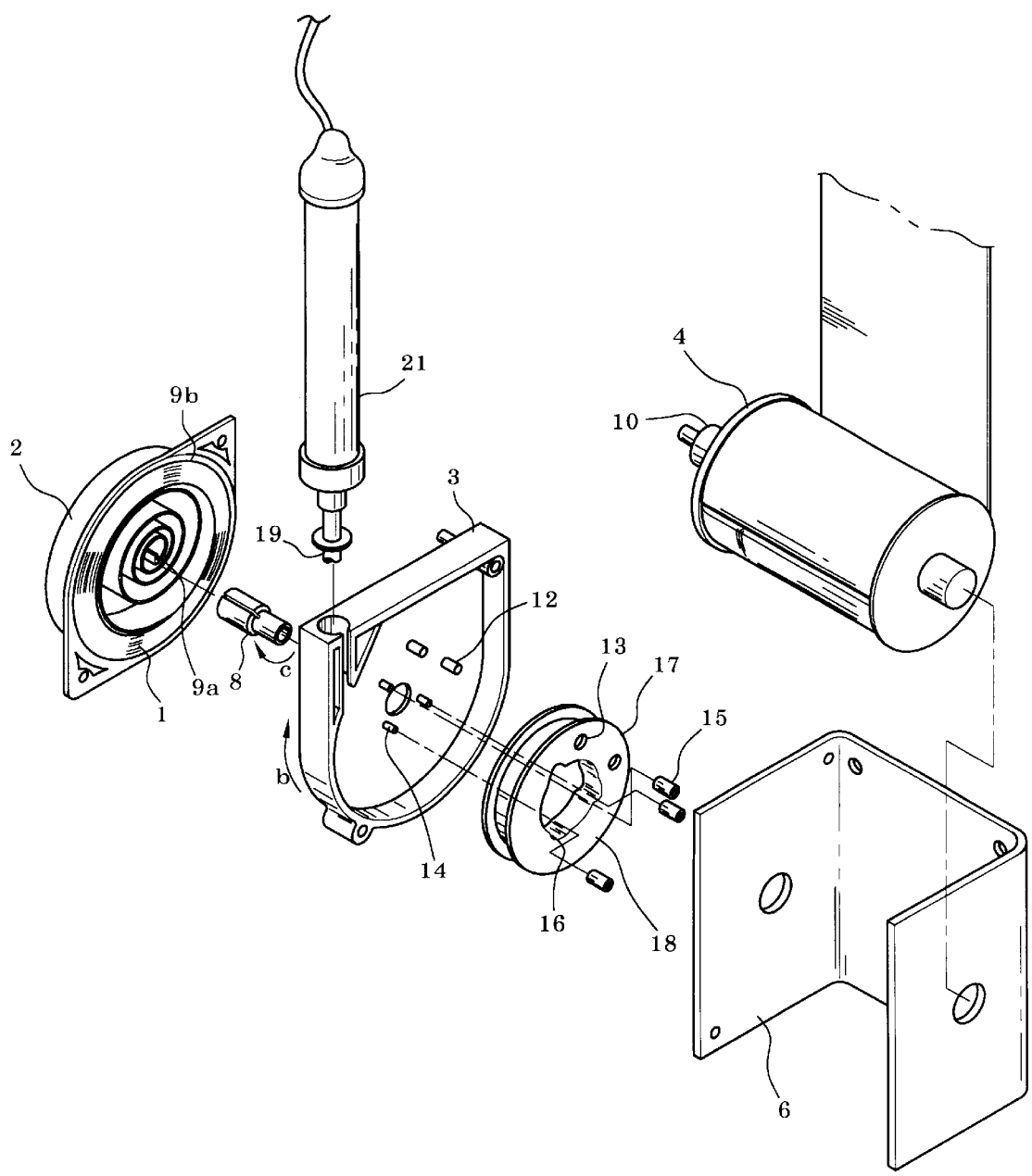
FIG. 1 is an exploded perspective view illustrating the configuration of a seat safety belt retractor according to the prior arts.
Figure 2:
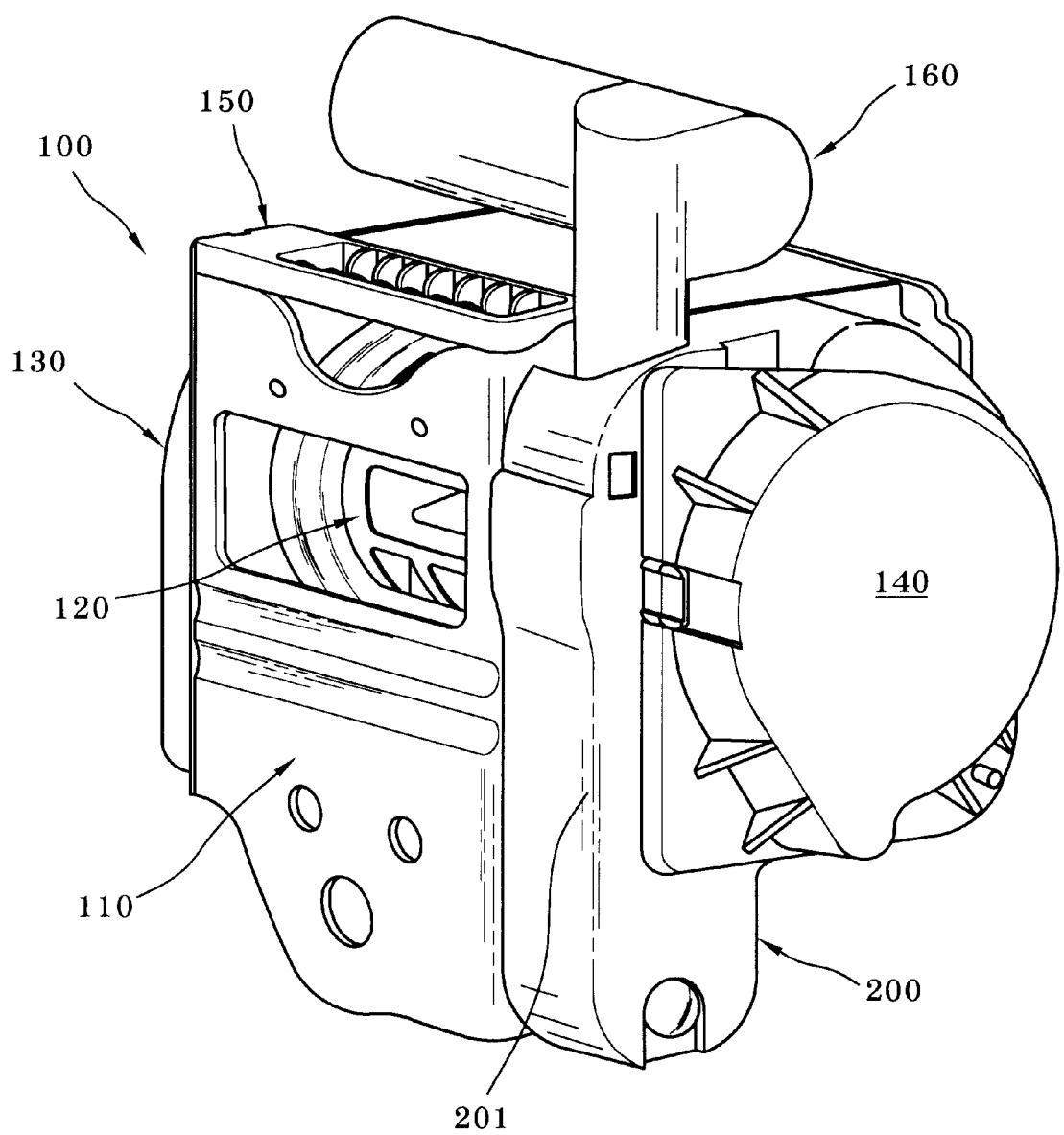
FIG. 2 is a perspective view illustrating a seat safety belt retractor including a pretensioner integrated with a force transmitting apparatus according to one embodiment of the invention.
Figure 3:
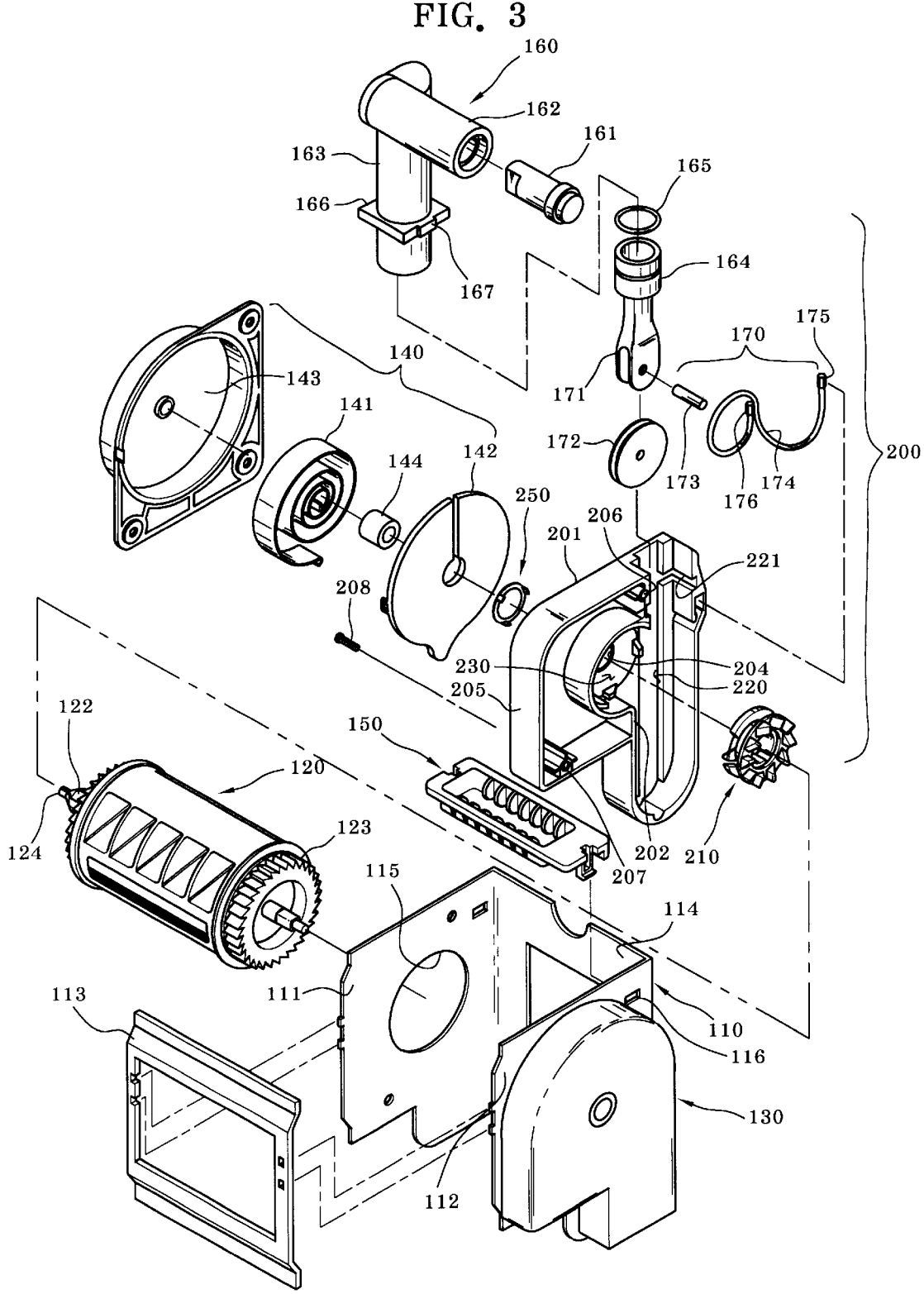
FIG. 3 is an exploded perspective view illustrating a seat safety belt retractor including a pretensioner integrated with a force transmitting apparatus according to one embodiment of the invention.

First, referring to FIGS. 2 and 3, a safety belt retractor 100 including a pretensioner integrated with a force transmitting apparatus comprises an U-shaped bracket 110 vertically mounted on a predetermined position of a vehicle; a reel 120 including a reel 120 ratably mounted on the bracket to allow the webbing of a safety belt, into which a reel shaft 122 is fitted; a locking portion 130 for restraining the reel 120 in the abnormal condition of the vehicle; a spring portion 140 mounted on the other side of the reel 120 and including an encaged spring 141 of a clock spring type to allow the reel 120 to wind the belt thereon by its elastic force; and the pretensioner 200 for reverse-rotating the reel 120 to withdraw a predetermined length of the safety belt by the force of the gas generating apparatus.

The U-shaped bracket 110 includes left and right leg portions 111 and 112 and front and rear frames 113 and 114. On the approximate center of both leg portions 111 and 112 there are holes 115 formed to rotatably support the flanges on both ends of the reel 120. The reel 120 has a drum shaped structure including a ratch gear 123 integrally formed on one side thereof.

The locking portion 130 includes a web sensor and a vehicle sensor well-known in this technical field to restrain the rotating of the reel 120 cooperating with the ratch gear 123.

Figure 10:
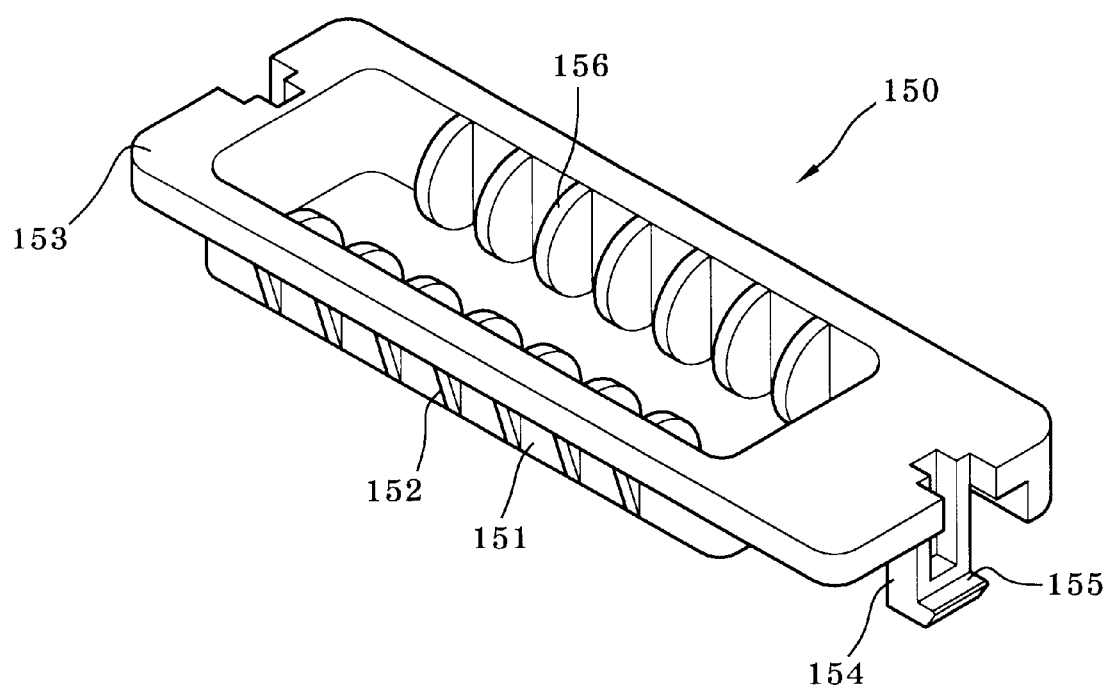
FIG. 10 is a perspective view illustrating a guider for introducing the webbing of the safety belt according to one embodiment of the invention.

The spring portion 140 includes a side plate 142 and a cover 143 to allow the spring 141 to be mounted therebetween, in which the spring 141 is biased to wind the belt on the reel 120. For example, a boss 144 is coupled with an inner end of the spring 141, rotatably positioned at the center of the cover 143 and coupled with a projection integrally projected from the reel shaft 122 of the reel 120. Herein, the side plate 142 functions to smooth the winding and unwinding of the spring 141, and the cover 143 is mounted on the left surface of the pretensioner 200 by means of a plurality of bolts. The guider 150 allows the movement of the safety belt to be performed therein during being wound on or released from the reel 120. Particularly, the guider 150 smoothly guides the webbing due to the reverse-rotating of the reel 120 upon the operating of the pretensioner 200. As shown in FIG. 10, the guider 150 includes a rectangular frame structure 151 integrally moulded. The frame structure 151 provided with a hollow portion at the center to allow the belt movement includes an inserting portion 152 inserted between the rear frame 114 and both leg portions 111, 112 and a rectangular flange 153 placed on their thickness portions. The rectangular flange 153 may have extending surfaces formed in a width direction of the leg portions 111, 112 different from each other. It means that the extending surface can be changed according to the width of the reel 120 mounted between the leg portions 111, 112 and parts mounted on either of left and right sides of the retractor. First hooking portions 154 are extended downward at a predetermined distance from the left and right portions of the rectangular flange 153 and include hooks 155 formed at their ends. A plurality of guide pieces 156 of an arc shape are projected to an equidistance and the same size from both walls of the inserting portion 152 to face each another. Therefore, the guider 150 is inserted between leg portions 111, 112 to hang the hooks 155 on fixing holes 116, respectively, thereby being assembled on the retractor.

Returning to FIG. 3, the pyrotechnic gas generating apparatus 160 reversely rotates the reel 120 within a predetermined time period, for example 0.002 of a second, upon the suddenly deceleration such as a crash of a vehicle to rewind the safety belt, forcedly, and restrain the driver or passenger on a seat back with a tension force overcoming the inertia of the vehicle. The pyrotechnic gas generating apparatus 160 includes a horizontal tube 162 into which a propellent charge cartridge 161 including an igniter electrically connected to ECU of the vehicle is inserted. The horizontal tube 162 is coupled with a cylinder 163 to be communicated therewith, in which the cylinder 163 is vertically extended at a predetermined distance from the horizontal tube 162. The cylinder 163 includes a piston 164 inserted therein, airtightenly, by an O-shaped seal ring 165, a middle flange 166 projected from both sides adjacent to the lower end portion thereof and a projection 167 formed on the same line as the middle flange 166 to face toward to the bottom surface a first chamber 220. Therefore, the cylinder 163 is inserted into the first chamber 220 in a manner to couple the middle flange 166 with a fitting groove 221 as described below in detail.

The force generated at the pyrotechnic gas generating apparatus 160 is transmitted to a force transmitting portion 170. The force transmitting portion 170 includes an arm 171 integrally connected to the piston 164, one end of which is branched; a pulley 172 rotatably mounted on the branched end of the arm 171 by a pin 173; and a cable 174 wound on a clutch disk 210 as described below passing through the pulley 172, in which the cable 174 includes first and second fixing pieces 176 and 175 formed on both ends thereof.

Figure 5:
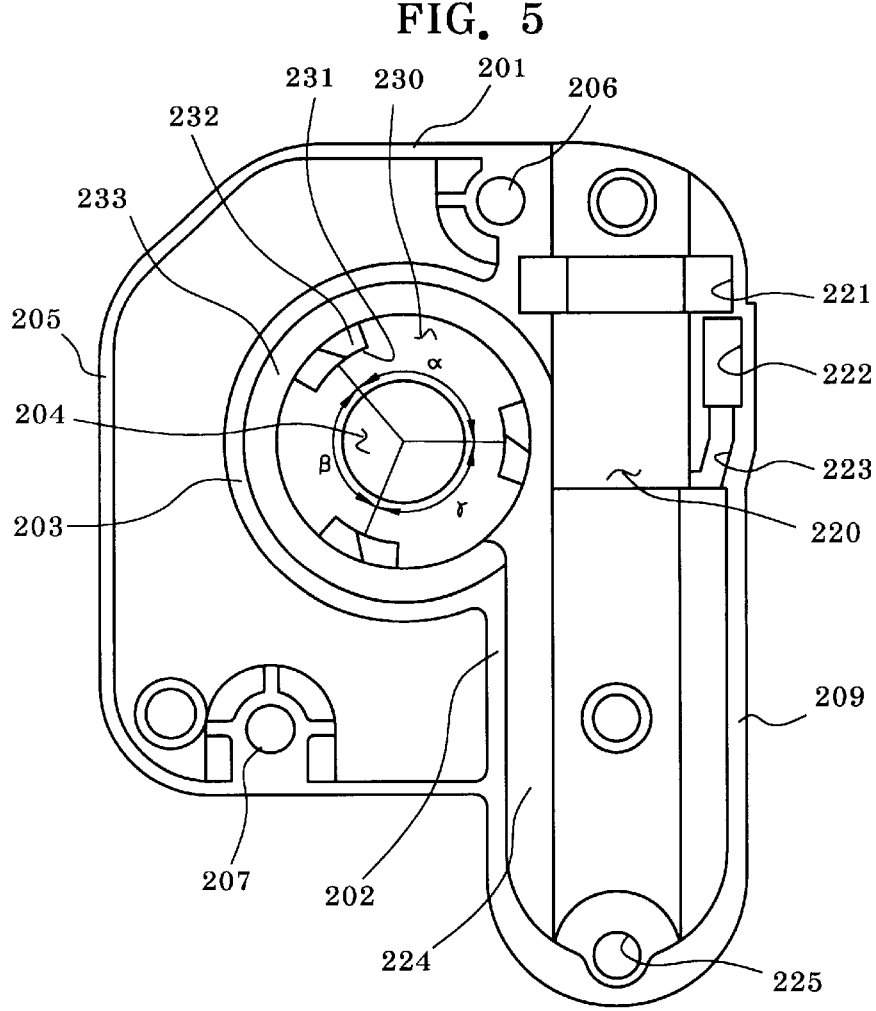
FIG. 5 is a front view illustrating the housing according to one embodiment of the invention.

The pretensioner 200 is mounted between one leg portion 111 of the U-shaped bracket 110 and the side surface of the spring portion 140 together with the pyrotechnic gas generating apparatus 160. The pretensioner 200 comprises a housing 201 and a clutching device including the first chamber 220 vertically formed to receive the force transmitting portion 170, a clutch disk 210 received in the first chamber 220 and a second chamber 230 having a first hole 204 formed at the center to pass through the reel shaft 122. Also, as shown in FIG. 5, the housing 201 includes a rectangular wall portion 205 extended from a middle wall portion 202 of the first chamber 220 to surround around the second chamber 230 at an interval distance. Screw coupling portions 206 and 207 are formed on upper and lower predetermined positions of the rectangular wall portion 205, for example the upper right and the lower left in the drawings, to be coupled with one leg portion 111 of the U-shaped bracket 110 by means of screws 208. Therefore, the pyrotechnic gas generating apparatus 160 curved in a L-shape is integrally received in the first chamber 220. The pyrotechnic gas generating apparatus 160 has a configuration adjustable to minimize the vertical and horizontal distances, thereby increasing the space efficiency of the retractor to be mounted in the vehicle.

Figure 4B:
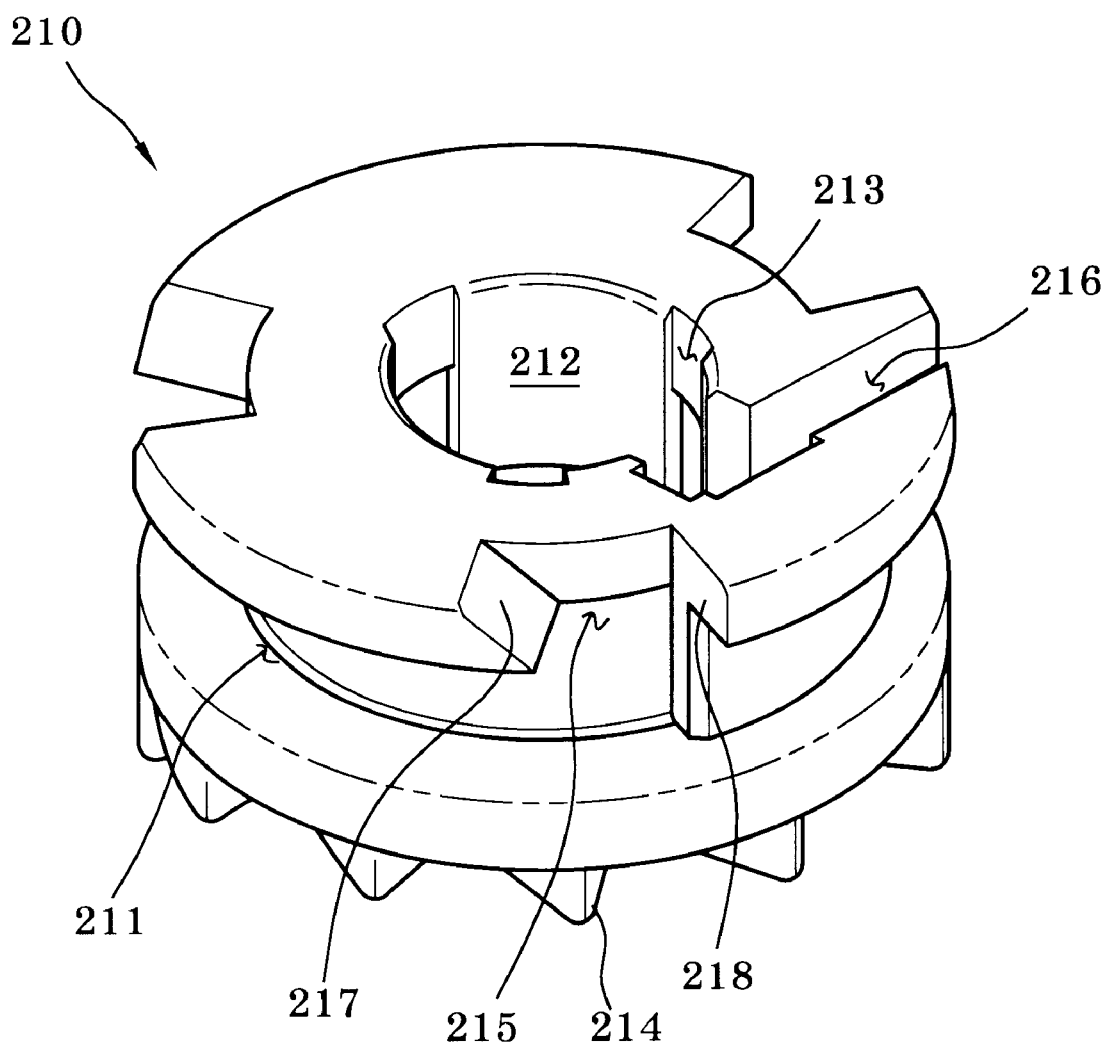

As shown in FIGS. 3, 4A and 4B, the clutch disk 210 has a structure similar to the pulley, which includes a fixing member 250 for fixing its position in the second chamber 230. The clutch disk 210 includes a circular groove 211 formed to have a predetermined width and depth around the periphery thereof, on which the cable 174 is wound, and a second hole 212 formed at the center to pass through the reel shaft 122. On the inner circumferential wall of the second hole 212, there are guide grooves 213 formed in an equidistance to second hooking portions 253 of the fixing member 250 as described below. A circumferential groove 219 is formed over the guide grooves 213 adjacent to one wall of the circular groove 211, for example a side surface against the reel 120, to allow each hook 254 of the second hooking portions 253 to be hung on the circumferential grooves 219. A plurality of the second coupling projections 214, for example 10 in the drawings, formed on the side surface facing against the reel 120, for example its upper surface, in a right angled triangle, one side of which is formed in a right angle and the other side of which is slanted. At least three of the coupling grooves 215 are formed on the other side of the clutch disk 210, for example a surface facing against the bottom surface of the second chamber 230, one side of which is right-angled to form a stopping surface 218 contacting with first coupling projections 231 as described below and the other side of which is slanted to form a sliding surface 217. The first fixing groove 216 is formed adjacent to any one of the coupling grooves 215 to allow the first fixing piece 176 of the cable 174 to be fitted thereinto.

The fixing member 250 includes a circular plate 251 of a ring type. At the center of the circular plate 251 there is formed a third hole 252 having the same size as that of the first hole 204. The second hooking portionss 253 are formed in an equidistance around the inner circumference of the third hole 252 to be inserted into the guide groove 213. The second hooking portion 253 include hooks 254 formed at the upper end thereof. Therefore, upon positioning the fixing member 250 on the other side of the wall portion of the housing 201 with the clutch disk 210 being in the second chamber 230 the second hooking portions 253 are inserted into the clutch disk 210 along the guide grooves 213, and then the each of the hooks 254 are introduced into the circumferential grooves 219 and placed on a predetermined position to couple the fixing member 250 with the clutch disk 210.

Figure 7A:
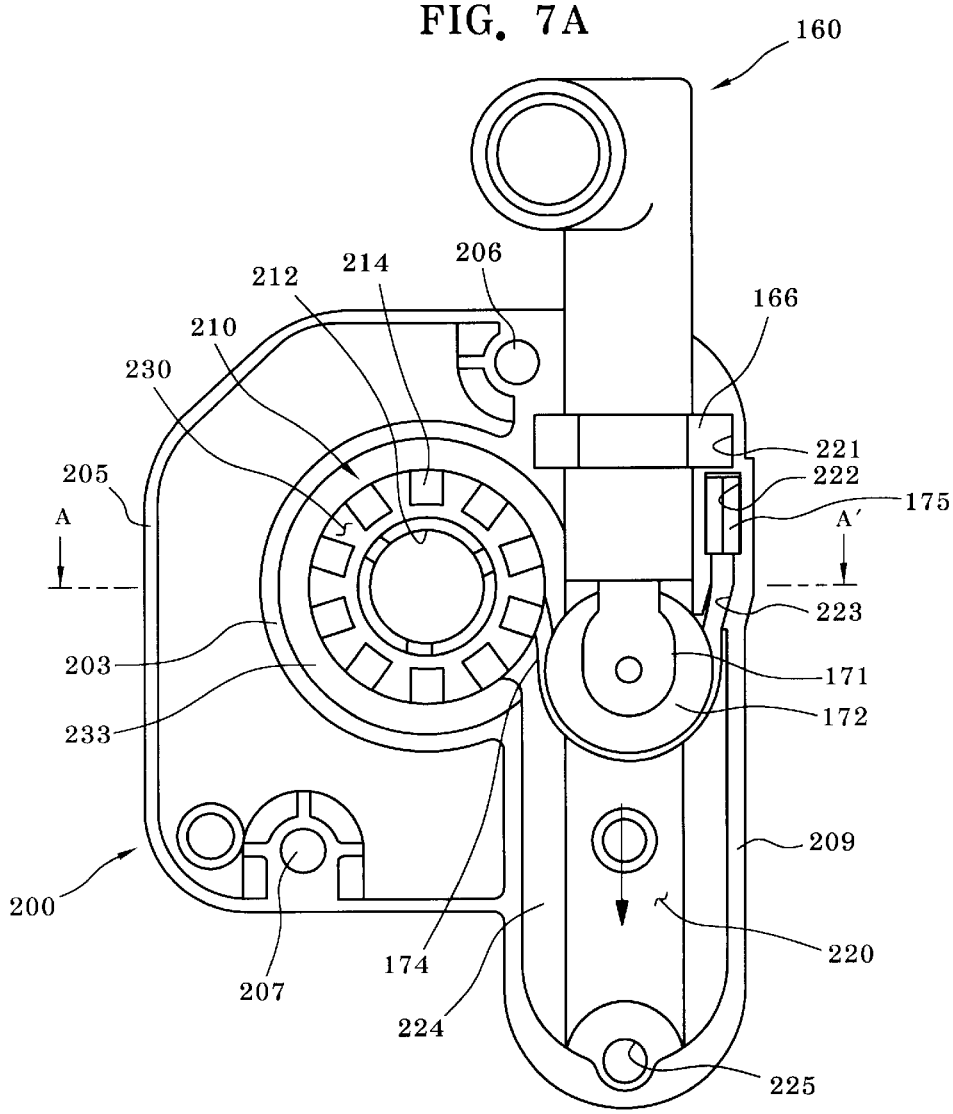
FIGS. 7A and 7B are front views illustrating the initial assembling state of mounting the clutch disk and a force transmitting portion in the housing according to one embodiment of the invention.
Figure 8A:
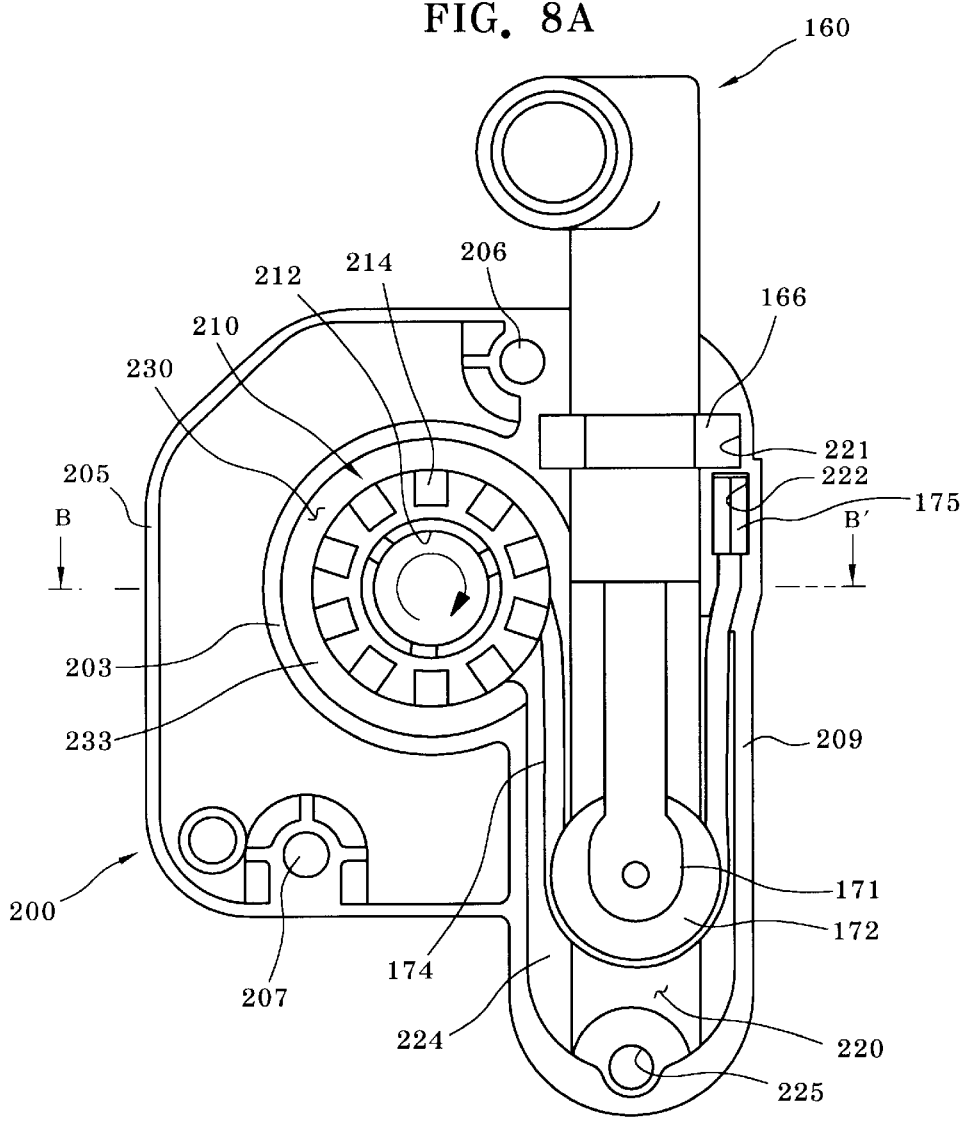
FIGS. 8A and 8B are front views illustrating the operating state of the force transmitting portion after mounting the clutch disk and the force transmitting portion in the housing according to one embodiment of the invention.

As shown in FIGS. 5, 7A and 8A, the first chamber 220 is surrounded by the middle wall portion 202 on any one of left and right sides of the housing 201, which has a lengthwise portion extended by adding a length slightly more than that of the arm 171 and the length of the part coupling with the cylinder 163, and a width portion formed as a hollow space to allow the pulley 172 of the force transmitting portion 170 to be moved therein. In other words, the middle wall portion 202 has a thickness on its upper portion subjected to position the cylinder 163 receiving a piston, which includes the fitting groove 221 into which the middle flange 166 on both sides of the cylinder 163 are fitted, the second fixing groove 222 formed below the fitting groove 221 to allow the second fixing piece 175 to be fixed therein and a guide groove 223 communicated with the second fixing groove 222 to allow the cable 174 to be inserted therein. The first chamber 220 includes step portions 224 formed lengthwise adjacent to the lower portion of the middle wall portion 202 which the cylinder 163 is not received, which allow a part of the arm 171 to be guided therebetween and the pulley 172 to be placed thereon. A screw hole 225 is formed adjacent to the lower end of the middle wall portion 202. Also, on the lower portion of the middle wall portion 202 there may be at least one hole formed to avoid the back pressure in the first chamber 220 caused by the operation of the force transmitting portion 170, which is not shown in the drawings.

Figure 6:
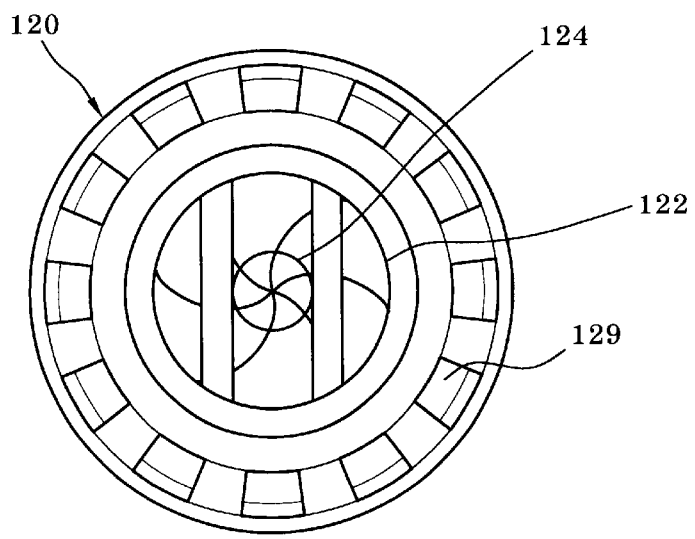
FIG. 6 is a cross-sectional view illustrating one side of a reel according to one embodiment of the invention.

Therefore, in order to mount the cylinder 163 of the gas generating apparatus 160 in the first chamber 220, the middle flange 166 is fitted into the fitting groove 221. As shown in FIGS. 7A and 8A, the end of the arm 171 is placed on the bottom surface below the step portions 224 to correspond with line A–A' and B–B' with being projected from the cylinder 163, and the pulley 172 is positioned on the step portions 224. The cable 174 is fixed at one end to the side wall portion 209 by fitting the second fixing piece 175 into the second fixing groove 222, inserted into the guide groove 223 to pass through the pulley 172, then wound around the clutch disk 210 by a predetermined turn to secure the traveling length and coupled at the other end to the clutch disk 210 by fitting the first fixing piece 176 into the first fixing groove 216. The second chamber 230 includes a circular wall portion 203 formed adjacent to the middle wall portion 202 to has a hollow space for receiving the clutch disk 210. In the second chamber 230, there are three of the first coupling projections 231 formed to have different arc angles α, β, γ by the reference of the reel shaft 122 of the reel 120 as shown in FIGS. 5 and 6. Each of the first coupling projections 231 has a right angled surface at one side and a slant surface 232 contacting with the sliding surface 217 of the coupling grooves 215 to allow the clutch disk 210 to be moved in a rotational direction. In other words, the first coupling projections 231 are escaped from the coupling grooves 215 to be placed on the left surface of the clutch disk 210. Herein, the reason that the first coupling projections 231 are arranged in different arc angles α, β, γ to one another is why the first coupling projections 231 are staggered from the coupling grooves 215 not to be inserted thereinto according to the rotation of the clutch disk 210 by dividing the circumference angle of 360°, properly. In the second chamber 230 there is a shoulder 233 formed adjacent to the inner surface of the circular wall portion 203 to be slightly higher than the first coupling projections 231 but lower than the circular wall portion 203, which functions to support the rotation of the clutch disk 210.

FIG. 6 shows one side surface of the reel 120 facing against the clutch disk. The reel 120 includes the reel shaft 122 fixed at the center thereto, in which the reel shaft 122 is provided with an axial projection 124 projected from its center. On one side surface adjacent to the circumference of the reel 120 there are a plurality of concaved grooves 129 or third coupling projections formed by the number equal to or more than that of the second coupling projections 214 on the clutch disk 210 to be coupled with the second coupling projection 214.

Figure 7B:
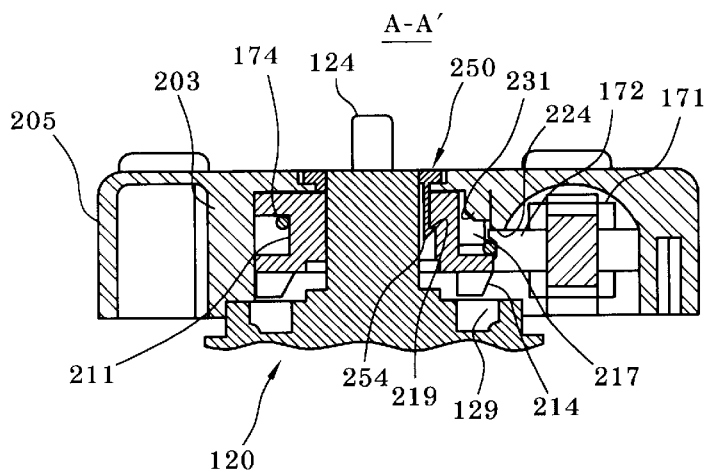
Figure 8B:
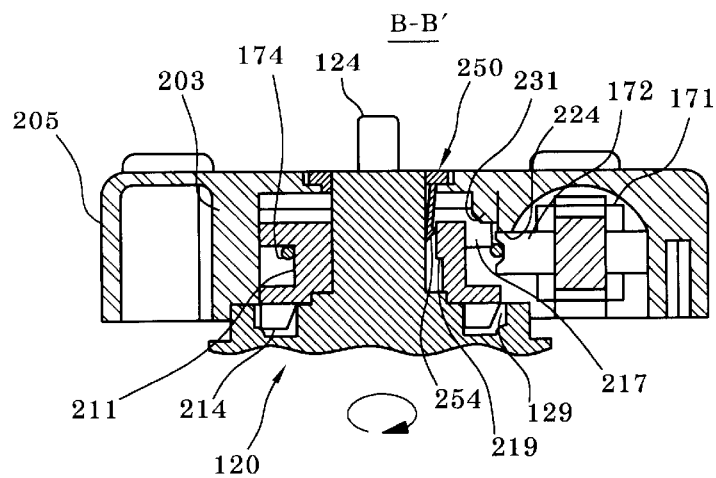
Figure 9:
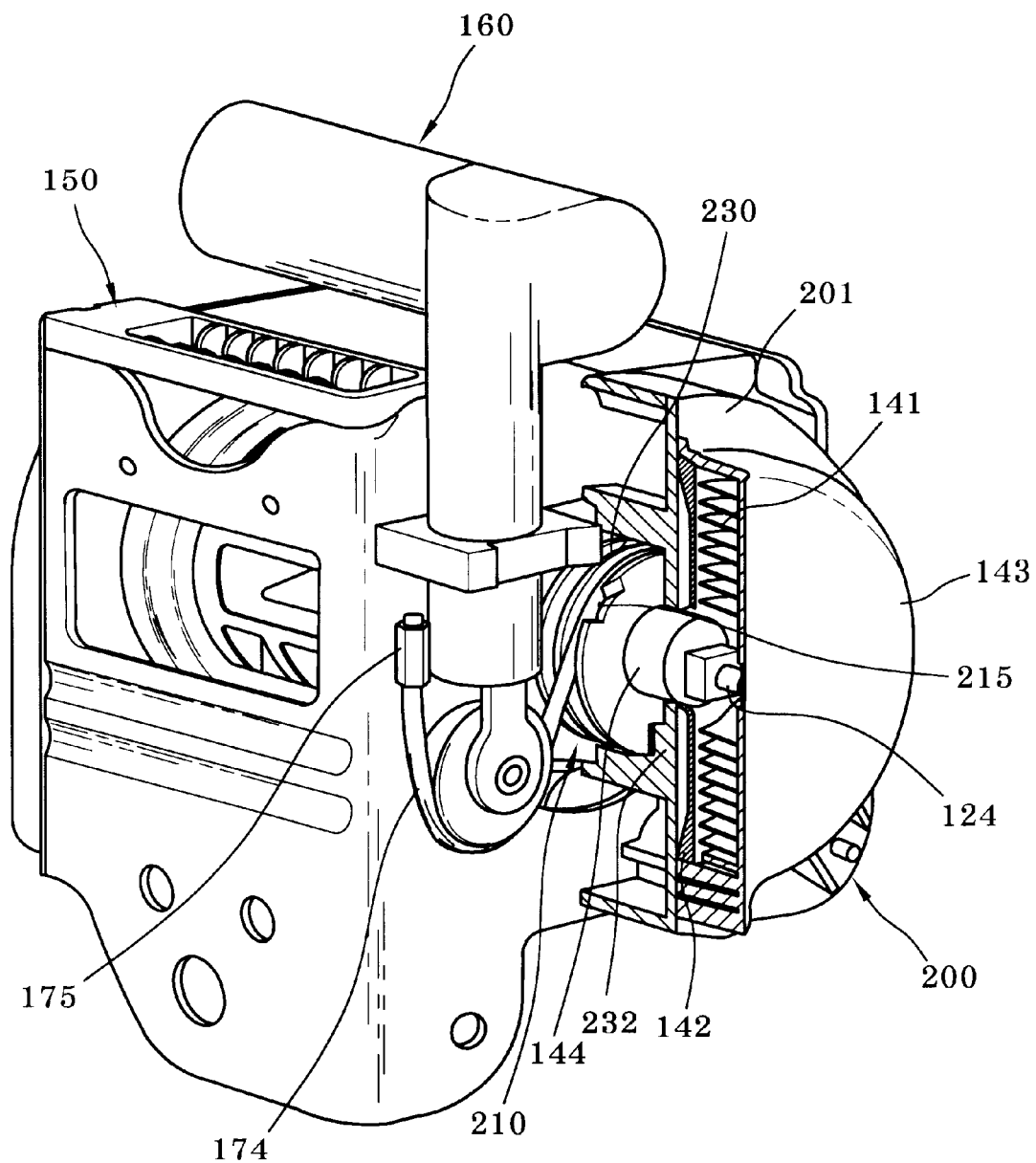
FIG. 9 is a perspective view illustrating the mounting of the pretensioner on the retractor with the housing being partly cut out according to one embodiment of the invention.

Therefore, as shown in FIGS. 7B, 8B and 9, the cylinder 163 of the pyrotechnic gas generating apparatus 160 is mounted in the first chamber 220 in a manner that the middle flange 166 is fitted into the fitting groove 221, the arm 171 fixed to the piston 164 in the cylinder 163 is placed on the bottom surface of the first chamber 220 along line A–A' of FIG. 7A and the pulley 172 is positioned on the step portions 224. The cable 174 is fixed at one end to a side wall portion 209 by fitting the second fixing piece 175 into the second fixing groove 222, inserted into the guide groove 223 to pass through the pulley 172, wound around the clutch disk 210 by a predetermined turn to secure the traveling length and coupled at the other end to the clutch disk 210 by fitting the first fixing piece 176 into the first fixing groove 216. Therefore, the force transmitting portion 170 is accomplished.

On the other hand, the clutch disk 210 is disposed in preferable insertion position of the second chamber 230 so that the first coupling projections 231 are inserted into the coupling grooves 215 of the clutch disk 210, respectively. The second coupling projections 214 are subjected to avoid the coupling with the concaved grooves 129. This coupling can be established by hanging the hooks 254 of the fixing member 2S0 on a predetermined position of the circumferential groove 219 of the clutch disk 210.

Next, the boss 144 is inserted onto the axial projection 124 passed through the first hole 204 of the housing 201, and then the cover 143 including encaged spring 141 is mounted on the out side of the housing 201 to accomplish the pretensioner 200, in which the one end of the spring 141 is fixed to the inner surface of the cover 143 and the other end is fixed to the boss 144. The pretensioner 200 is mounted on the U-shaped bracket 110 together with the locking portion 130 to accomplish the safety belt retractor.

Upon the suddenly deceleration such as a crash of a vehicle, the ECU generates a vehicle's abnormal state sensing signal to apply it to the igniter and detonate the propellent charged cartridge 161. At that time, the pyrotechnic gas generating apparatus 160 generates hot high pressure of gas to move the piston 164 in the cylinder 163 in a high speed. Simultaneously, the arm 171 and the pulley 172 connected to the piston 164 are quickly moved downward to push the middle portion of the cable 174 down. It seems as if the second fixing piece 175 of the cable 174 generates the supporting force with being fitted into the second fixing groove 222, and the first fixing piece 176 pulls the second fixing groove 216 of the clutch disk 210. As the cable 174 rotates the clutch disk 210, forcedly, the clutch disk 210 is escaped from the first coupling projections 231 of the second chamber 230 with being slided along the slant surface of the coupling grooves 215 to be rotatably supported on the shoulder 233. Thus, the second coupling projections 214 are mounted into the concaved grooves 129 of the reel 120. Therefore, the reel 120 is rotated opposite to the withdrawal of the safety belt to perform the webbing. Under the abnormal condition of the vehicle, the webbing rewinds the safety belt on the reel 120 to a predetermined length, for example about 20 cm. Such like rewound safety belt keeps the passenger or driver securely in a seat back, thereby protecting the occupants.

Figure 11:
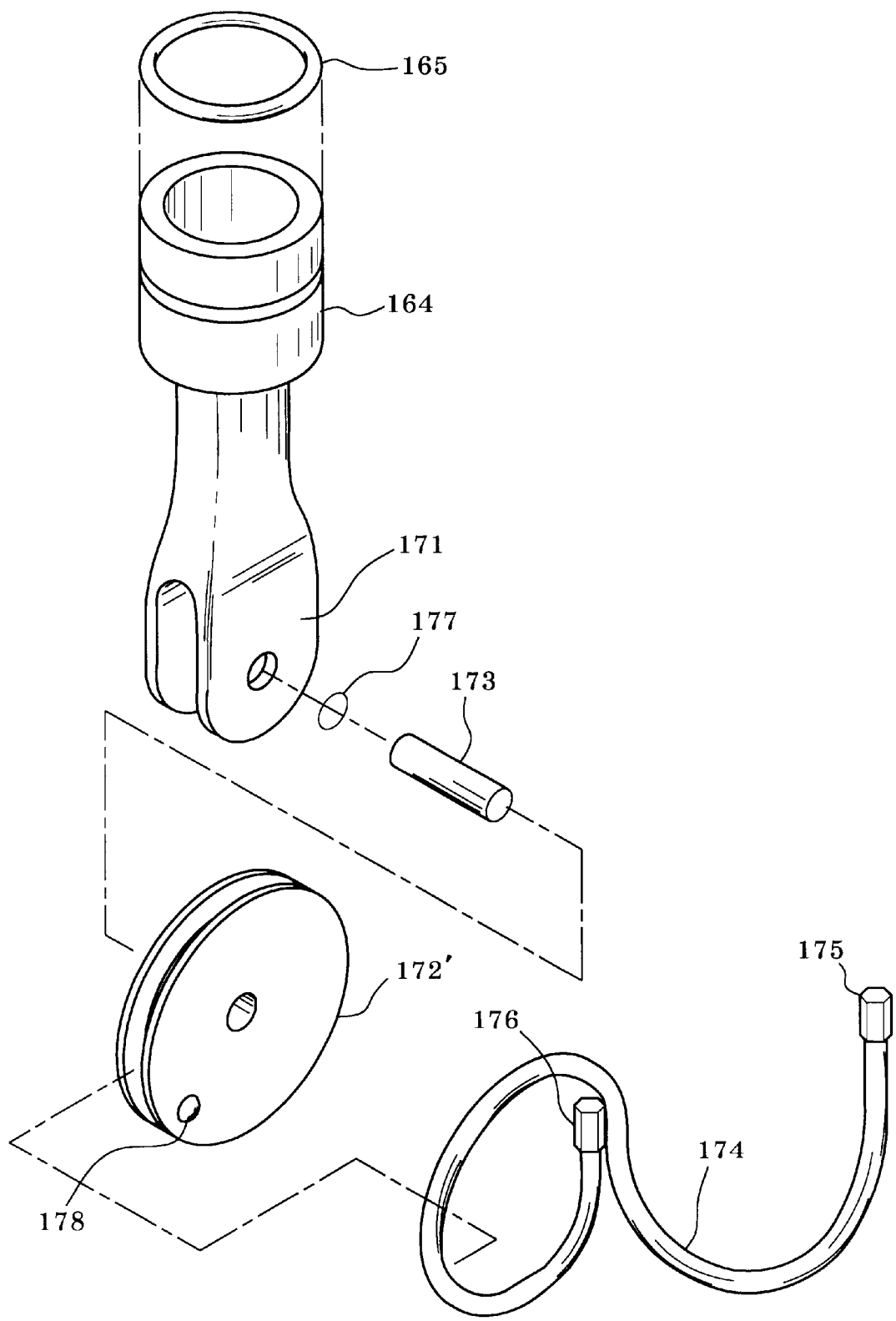
FIG. 11 is an exploded perspective view illustrating a force transmitting portion according to other embodiment of the invention.

According to another embodiment of the invention, as shown in FIG. 11, a pretensioner 200 includes a force transmitting portion 170 having the same configuration as that of above embodiment except that another pulley 172' is provided with a weight 178 to have an eccentric force. The same references are given to the same parts as those of first embodiment, and its detailed explanation will be deleted.

In the drawing, a pin 173 is coupled into a small bearing 177 of the arm 173 integrated with the piston 164 to freely rotate the pulley 172'. The weight 178 fixed to the pulley 172' is positioned below the diameter line adjacent to the circumference thereof. The weight 178 gives the eccentricity to the mass of the pulley 172' to accelerate the rotating of the pulley 172', thereby increasing the pulling efficiency of the cable 164.

Figure 12:
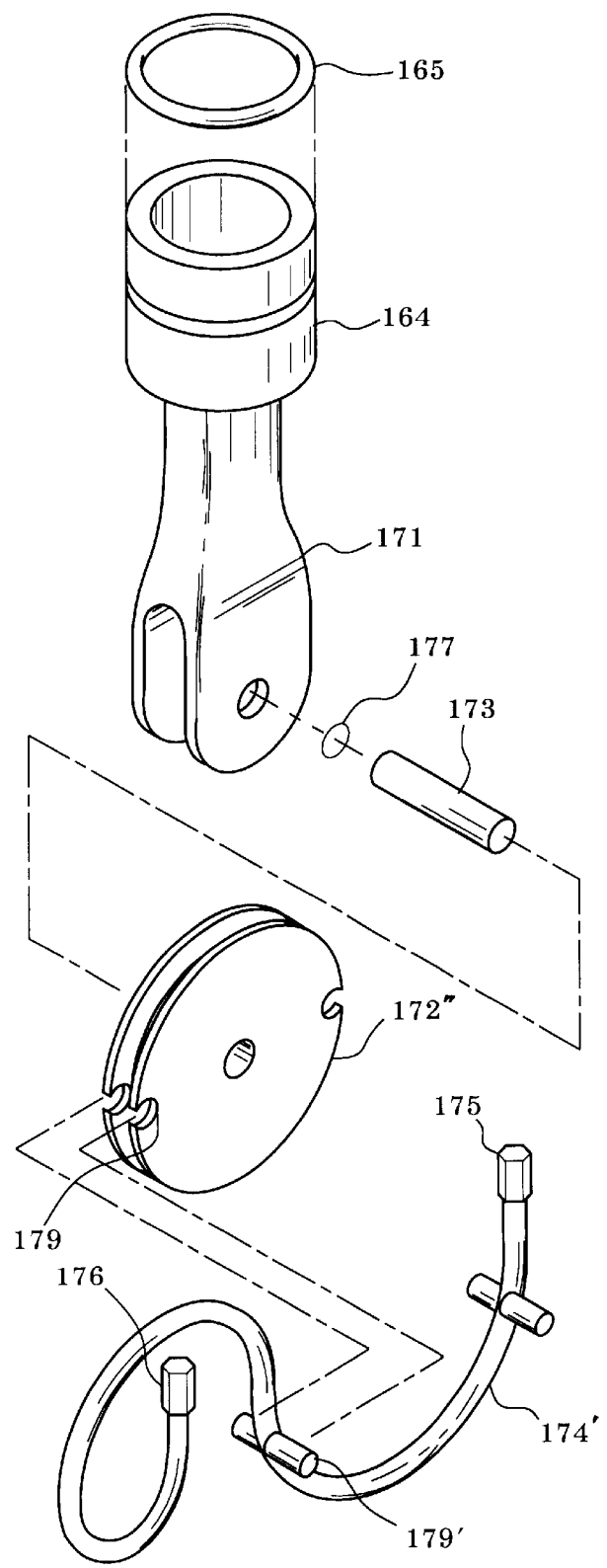
FIG. 12 is an exploded perspective view illustrating a force transmitting portion according to another embodiment of the invention.

According to another embodiment of the invention, as shown in FIG. 12, supporting grooves 179 are formed on the diameter line around the periphery of the other pulley 172". Two supporting bars 179' are mounted on a predetermined position of another cable 174' spaced in a half-diameter away from each other. Same references are given to the same parts as those of first embodiment, and its detailed explanation will be deleted. Therefore, the supporting bars 179' fitted into the supporting grooves 179 functions to transmit the force from the pyrotechnic gas generating apparatus to the cable 174', effectively.

As described above, according to the invention a pretensioner comprises a pyrotechnic gas generating apparatus curved in a horizontal direction to be mounted on the upper portion of a safety belt retractor. Due to it, it has an advantage in that the total volume of the safety belt retractor is contracted to enable the mounting of the safety belt retractor on a small vehicle.

According to the invention, a pretensioner integrated with a pyrotechnic gas generating apparatus can be easily mounted on one frame leg portion of a safety belt retractor as a separate unit. In a housing, a pulley is subjected to pull a cable and to be moved along a predetermined path at a minimized traveling distance with respect to a belt length of the cable to be withdrawn, thereby accomplishing the effective webbing operation of a reel.

According to the invention, a pretensioner comprises a pulley provided with an eccentric weight mounted thereon or a cable provided with two supporting bars and a pulley including supporting grooves into which the supporting bars are respectively fitted, so that the pulley pulls the cable down, effectively, thereby increasing the force transmitting efficiency of a clutch disk and rotating the clutch disk, exactly and speedily.

Although the invention is illustrated and described herein as embodied in a few embodiments, it is not intended to be limited to the details of the invention. It is apparent that various modification may be made therein without departing from the sprit of the invention and within the scope and range of the equivalents of the claims.

What is claimed is:

1. A safety belt retractor including a reel rotatably mounted on an U-shaped bracket to perform the webbing operating of a safety belt, a locking portion for restraining the rotating of the reel cooperating with a ratchet gear formed on one side of the reel in an abnormal state of a vehicle, a spring portion including a spring of a clock spring type mounted on the other side of the reel to enable the reel to wind the belt thereon and a pretensioner mounted between the inner surface of the spring portion and the U-shaped bracket to reverse-rotate the reel and then withdraw a predetermined length of the safety belt by the force generated in a gas generating apparatus; comprises a pyrotechnic force generating means including a horizontal tube with a propellent charge cartridge mounted therein, a cylinder vertically extended from the other side of the horizontal tube and a piston movably mounted in the cylinder;

a housing receiving one end of the cylinder with the horizontal tube being supported on the U-shaped bracket to cooperate with the force generating means in order to reverse-rotate the reel upon the force generating;

a force transmitting portion including an arm positioned in a first chamber of the housing, one end of which is directed to the piston in the cylinder and the other end of which is extended out of the cylinder, a pulley rotatably mounted on axes of the other branched end of the arm and a cable fixed at one end to a predetermined position of the housing, passed through the pulley, wound around a clutch disk by a predetermined turn and fixed at the other end to a predetermined position of the clutch disk; and a pretensioner positioned in a second chamber adjacent to the first chamber, which comprises the clutch disk and a clutch portion, in which the clutch disk includes a circular groove formed around the periphery thereof to allow a predetermined length of the cable to be wound thereon, a plurality of the second coupling projections each having a right-angled surface toward one direction and a slanted surface toward the other direction adjacent to the periphery of one side surface thereof, at least three of coupling grooves each cut out at one side in a right-angle and at the other side in a slant angle and a first fixing groove formed to fix the other end of the cable, and the clutch portion includes at least three of first coupling projections each forming a slanted surface at one side and a right-angled surface at other side for cooperating with the coupling grooves to allow the clutch disk to be reversely rotated and a plurality of third coupling projections or concaved grooves formed at the positions facing to the second coupling projections on one side surface of the reel for coupling with the second coupling projections.

2. The pretensioner integrated with the pyrotechnic gas generating apparatus according to claim 1, in which: at least three of the first coupling projections in the second chamber are positioned at different arc angles $\alpha$, $\beta$, $\gamma$ to be staggered from one another properly dividing the circumferential angle of 360° so that they are respectively inserted into preferable insertion position of the coupling grooves.

3. The pretensioner integrated with the pyrotechnic gas generating apparatus according to claim 1, in which: a small bearing and a pin are used to mount the pulley on the arm to freely rotate the pulley, thereby minimizing the friction of the cable on the pulley.

4. The pretensioner integrated with the pyrotechnic gas generating apparatus according to claim 1, in which: a weight is provided on the pulley to have an eccentricity so that the weight center of the pulley is slightly inclined toward one direction.

5. The pretensioner integrated with the pyrotechnic gas generating apparatus according to claim 1, in which: supporting grooves are formed on both sides of the pulley and supporting bars are fixed to positions corresponding to at least one predetermined length of the cable, thereby securing the exact traveling length of the cable.

6. The pretensioner integrated with the pyrotechnic gas generating apparatus according to claim 1, in which: the safety belt retractor further comprises a guider for guiding the safety belt being wound on or released from the reel, thereby smoothing the webbing due to the reverse-rotating of the reel upon the operating of the pretensioner.

* * * * *